United States Patent [19]

Kubo

[11] Patent Number: 5,463,763
[45] Date of Patent: Oct. 31, 1995

[54] APPARATUS AND METHOD FOR SUPERVISING MULTIPROCESSOR COMMUNICATIONS USING MESSAGES TRANSMITTED BETWEEN PROCESSORS IN A CIRCULAR FASHION

[75] Inventor: Hitoshi Kubo, Tanashi, Japan

[73] Assignee: Kabushiki Kaisha Toshiba, Kawasaki, Japan

[21] Appl. No.: 89,636

[22] Filed: Jul. 12, 1993

Related U.S. Application Data

[63] Continuation of Ser. No. 536,502, Jun. 11, 1990, abandoned.

[30] Foreign Application Priority Data

Jun. 13, 1989 [JP] Japan ..................... 1-150193

[51] Int. Cl.⁶ ........................................ G06F 11/00
[52] U.S. Cl. ................. 395/182.02; 395/200.01; 364/DIG. 1
[58] Field of Search ..................... 395/525, 200, 395/800; 340/825.05; 370/85.5, 85.12, 85.15

[56] References Cited

U.S. PATENT DOCUMENTS

| | | | |
|---|---|---|---|
| 4,228,496 | 10/1980 | Katzman et al. | 364/200 |
| 4,701,756 | 10/1987 | Burr | 340/825.02 |
| 4,718,002 | 1/1988 | Carr | 364/200 |
| 4,747,100 | 5/1988 | Roach et al. | 370/86 |
| 4,763,315 | 8/1988 | Nakayashiki et al. | 370/16 |
| 4,868,818 | 9/1989 | Madan et al. | 371/11.3 |
| 4,881,074 | 11/1989 | Reichbauer et al. | 340/825.05 |
| 4,949,337 | 8/1990 | Aggers et al. | 370/85.4 |
| 5,140,586 | 8/1992 | Kloper et al. | 370/85.5 |

OTHER PUBLICATIONS

Omri Serlin, "Fault–Tolerant Systems in Commercial Applications," Computer, Aug. 1984, pp. 19–27 and chart entitled "Commercial Fault–Tolerant Systems."
D. Scavezze, "Nodes Sound Off to Control Access to Local Network," Electronics, vol. 54, No. 12, Jun. 16, 1981, pp. 176–181.

Primary Examiner—William M. Treat
Attorney, Agent, or Firm—Finnegan, Henderson, Farabow, Garrett & Dunner

[57] ABSTRACT

A multiprocessor system includes a plurality of processors each of which functions a data processing node. Each of the processors comprises an address management table in which prior node and next node addresses which are respectively assigned to its prior node and next node processors, a normal message transmitting section for transmitting to the next node processor designated by the next node address a normal operation message indicating that it is operating normally and a message supervising section for receiving and supervising a message transmitted from its prior node processor designated by the prior node address and detecting the occurrence of a failure in its prior node processor according to whether or not a normal operation message indicating that the prior node processor is operating normally is transmitted from the prior node processor within a preset monitoring time.

7 Claims, 10 Drawing Sheets

| MY-NODE | GF-NODE | FA-NODE | SON-NODE |
|---|---|---|---|
| A | A | A | A |

R4　　　　R3　　　　R2　　　　R1　　～T1

F I G. 11A

| MY-NODE | GF-NODE | FA-NODE | SON-NODE |
|---|---|---|---|
| A | A | A→B | A→B |

| MY-NODE | GF-NODE | FA-NODE | SON-NODE |
|---------|---------|---------|----------|
| B | B | A | A |

| MY-NODE | GF-NODE | FA-NODE | SON-NODE |
|---------|---------|---------|----------|
| A | A→B | B | B |

FIG. 13A

| MY-NODE | GF-NODE | FA-NODE | SON-NODE |
|---------|---------|---------|----------|
| B | B | A | A→C |

FIG. 13B

| MY-NODE | GF-NODE | FA-NODE | SON-NODE |
|---|---|---|---|
| C | A | B | A |

| MY-NODE | GF-NODE | FA-NODE | SON-NODE |
|---|---|---|---|
| A | B | B→C | B |

| MY-NODE | GF-NODE | FA-NODE | SON-NODE |
|---|---|---|---|
| B | B→C | A | C |

APPARATUS AND METHOD FOR SUPERVISING MULTIPROCESSOR COMMUNICATIONS USING MESSAGES TRANSMITTED BETWEEN PROCESSORS IN A CIRCULAR FASHION

This application is a continuation of application Ser. No. 07/536,502, filed Jun. 11, 1990, now abandoned.

BACKGROUND OF THE INVENTION

1. Field of the Invention

The present invention relates to a loosely coupled multiprocessor system and, more particularly, to a loosely coupled multiprocessor system for supervising the operating state of a plurality of processors by means of a supervisory ring.

2. Description of the Related Art

In general, a loosely coupled multiprocessor system comprises a plurality of processors and those processors are interconnected by a bus dedicated to inter-CPU data communications or a network such as a local area network (LAN). In such a loosely coupled multiprocessor system, each processor is operated by an individual operating system. For this reason, even if a processor becomes unable to operate normally due to a failure in its hardware or software, the failing processor may be replaced with another processor, thus maintaining the reliability of the entire operation of the loosely coupled multiprocessor system.

The failing processor can be discovered by a process of supervising whether or not the processors are operating normally. As supervisory processes, the following two methods are known.

One of the methods is for each of the normally operating processors to broadcast a message, indicating that it is operating normally, to all of the other processors. With this method, since the operating state of each processor is broadcast to all other processors, each processor can identify the operating states of the other processors, namely whether they are either in the normally operating state or in a failed state. With this method, however, the message of normal operation has to be continually issued, thus impairing the main purpose of the loosely coupled multiprocessor system, i.e. the data processing function, when a large number of processors are involved in the system.

The other supervisory method is to divide each of the processors composing the loosely coupled multiprocessor system into a master processor and a slave processor so that each of the master processors can supervise the operating state of its respective individual slave processor. With this method, messages for supervision will not be continually issued in the multiprocessor system as opposed to the former method. However, if a failure should occur in a master processor, the other processors will not be able to identify the occurrence of that failure and, moreover, the operating state of the slave processor of the failing master processor will not be supervised.

SUMMARY OF THE INVENTION

It is an object of the present invention to provide a multiprocessor system which permits the execution of a highly reliable supervising process with a minimum of communication messages.

It is another object of the present invention to provide a highly reliable supervising method of supervising processors with a minimum of communication messages.

The multiprocessor system of the present invention comprises a plurality of processors, each of which functions as a data processing node, each of said processors comprising: address storage means for storing an address assigned to its next node processor as a next node address and an address assigned to its prior node processor as a prior node address so that said processors may be coupled in a ring; normal message transmitting means for transmitting a normal operation message indicating that the processor is operating normally to said prior node processor designated by said prior node address at regular intervals; and message supervising means for receiving and supervising a message transmitted from said next node processor designated by said next node address and detecting the occurrence of a failure in said next node processor according to whether or not a normal operation message indicating that said next node processor is operating normally is transmitted from said next node processor within a preset monitoring time.

In the multiprocessor system, a plurality of processors are coupled in a ring in accordance with the next node address and the prior node address stored in each processor, each processor supervises the operating state of its next processor in accordance with a message transmitted from the next node processor and the operating state of each processor is supervised by its prior node processor in accordance with a message transmitted to the prior node processor. For this reason, the processors can supervise each other merely by transmission of messages to their respective prior node processors. Therefore, a highly reliable supervisory process can be achieved with few communication messages, improving the data processing performance of the multiprocessor system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
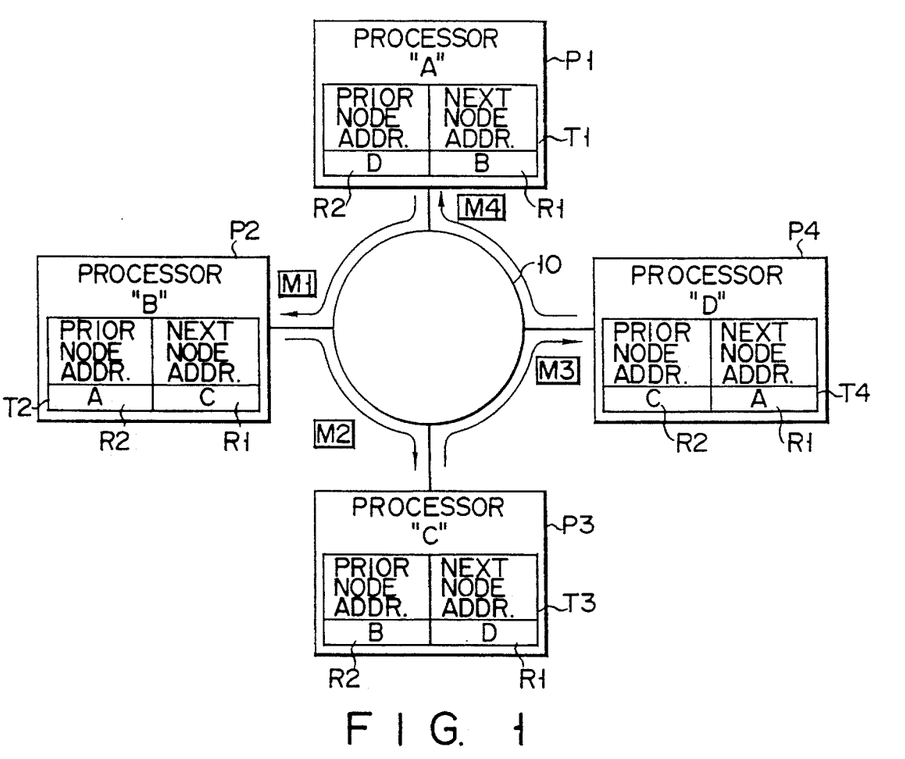
FIG. 1 is a block diagram of a loosely coupled multiprocessor system embodying the present invention.

Referring now to FIG. 1, a loosely coupled multiprocessor system embodying the present invention comprises first to fourth processors P1 to P4 which are interconnected by a communication line 10 such as a bus or a LAN. Each of processors P1 to P4 operates in accordance with an individual operating system and serves as a data processing node in the loosely coupled multiprocessor system.

Processors P1 to P4 are assigned their respective addresses for data communications among them. More specifically, first processor P1 is assigned an address "A", second processor P2 is assigned an address "B", third processor P3 is assigned an address "C" and fourth processor P4 is assigned an address "D". Each of processors P1 to P4 can specify any other processor by use of its address so as to establish communication with it.

Furthermore, each of processors P1 to P4 stores an address assigned to a node of the next processor as a "next" node address and an address assigned to a node of the previous processor as a "prior" node address, so that each of processors P1 to P4 can be linked together in a ring. That is, processor P1, assigned address "A", contains an address management table T1, which has an address storage area R1 in which a next node address representing a processor assigned to the next node of processor P1 (in this example, the address "B" assigned to processor P2) and an address storage area R2 in which a prior node address representing a processor assigned to the prior node of processor P1 (in this example, the address "D" assigned to processor P4).

Likewise, processor P2, assigned address "B", also contains an address management table T2, which has an address storage area R1 in which a next node address representing a processor assigned to the next node of processor P2 (in this example, address "C" assigned to processor P3) and an address storage area R2 in which a prior node address representing a processor assigned to the prior node of processor P2 (in this example, address "A" assigned to processor P1). Furthermore, processor P3 assigned address "C" and processor P4 assigned address "D" also contain address management tables T3 and T4, respectively. In address storage area R1 of management table T3 of processor P3 is stored a next address representing a processor assigned to the next node of processor P3 (in this example, the address "D" assigned to processor P4), and in address storage area R2 of table T3 is stored a prior node address representing a processor assigned to the prior node of processor P3 (in this example, the address "B" assigned to processor P2). Likewise, in address storage area R1 of management table T4 of processor P4 is stored a next address representing a processor assigned to the next node of processor P4 (in this example, the address "A" assigned to processor P1), and in address storage area R2 of table T4 is stored a prior node address representing a processor assigned to the prior node of processor P4 (in this example, the address "C" assigned to processor P3). In this way, a prior node address and a next node address are entered into the address management table of each of processors P1 to P4. Such assignment of prior node addresses and next node addresses allows each of processors P1 to P4 to be coupled together in a supervisory ring.

Processor P1 transmits a message M1 of normal operation indicating that processor P1 itself is operating normally to next node processor P2 periodically at an interval of a given time (ALIVETIME) preset in the time management table, which will be described later in conjunction with FIG. 4, and supervises a message M4 transmitted from prior node processor P4 to processor P1. Likewise, processors P2, P3 and P4 transmit messages M2, M3 and M4 of normal operation to their respective next node processors periodically at an interval of the given time (ALIVETIME) and supervise messages transmitted from their respective prior node processors.

Figure 2:
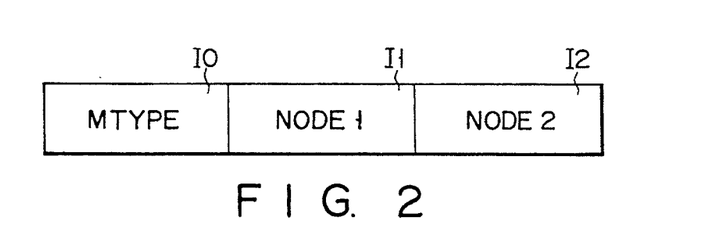
FIG. 2 illustrates the contents of a message transmitted from each processor in the loosely coupled multiprocessor system of FIG. 1.

Each of messages M1 to M4 transmitted from processors P1 to P4 to their respective next node processors contains message type information (MTYPE) I0, first node information (NODE1) I1 and second node information (NODE 2) I2 as shown in FIG. 2. The message type information (MTYPE) I0 indicates the type of message. In the case of a normal operation message indicating that a processor is operating normally, the message type information I0 is set at to "0". In the case of a recovery message indicating that a processor has recovered from a failure, the message type information I0 is set at "1". In the case of a node change message which prompts a destination processor to change its next node address, the message type information I0 is set at "2".

In the first node information (NODE1) I1 is contained the address representing the processor that is the transmission source node of the message. In the second node information (NODE2) I2 is contained the address representing the prior node processor of a transmission source node where the message is a normal operation message or a new next node address to which the next node address is to be changed where the message is a node change message. In the case of a recovery message, the second node information I2 is not used and remains a free area.

Next, the address management table of each of processors P1 to P4 will be described in detail with reference to FIG. 3.

In reality, not only is the above-described information indicative of the name of the next node and the name of the immediately prior node entered in the address table, but also information indicative of the name of the second prior node, i.e., the name of a node taking rank immediately before the immediately prior node, and the name of its own node. Hereinafter, to simplify the description, the next node is referred to as a son node, the immediately prior node as a father node, the second upper node as a grandfather node and its own node as my node.

Figure 3:
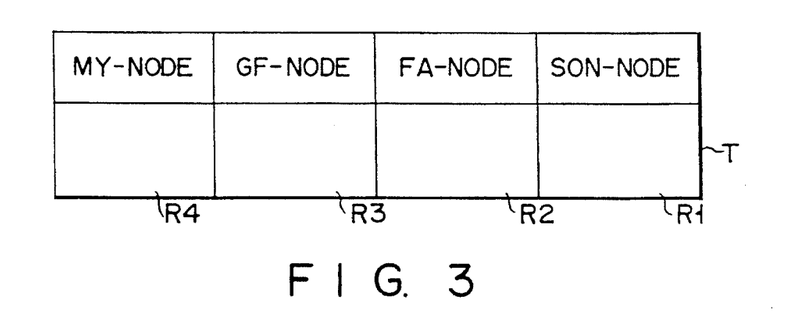
FIG. 3 illustrates the contents of an address management table in each processor in the loosely coupled multiprocessor system of FIG. 1.

That is, the address management table T is comprised of four address storage areas R1 to R4 as illustrated in FIG. 3. In address storage area R1 is stored an address indicative of the name of the son node (SON-NODE). In address storage area R2 is stored an address indicative of the name of the father node (FA-NODE), in address storage area R3 is stored an address indicative of the name of the grandfather node (GF-NODE), and in address storage area R4 is stored an address indicative of the name of my node (MY-NODE). Considering address management table T1 of processor P1 by way of example, where such a supervisory ring as shown in FIG. 1 is formed, the address "B" is stored in address storage area R1 as the name of the son node, the address "D" is stored in address storage area R2 as the name of the father node, the address "C" is stored in address storage area R3 as the name of the grandfather node and the address "A" is stored in address storage area R4 as the name of my node.

Figure 4:
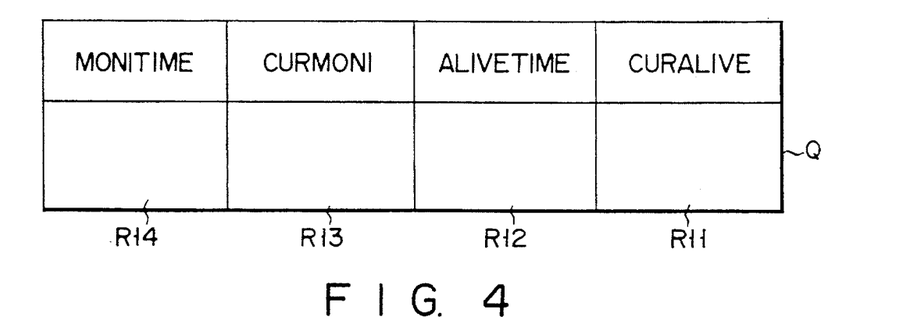
FIG. 4 illustrates the contents of a time management table in each processor in the loosely couple multiprocessor system of FIG. 1.

The processor supervising process is executed by each of processors P1 to P4 utilizing such an address management table as shown in FIG. 3 and such a time management table Q as shown in FIG. 4. Though not shown in FIG. 1, time management table Q is prepared in each of processors P1 to P4 in the same manner as address management table T.

As shown in FIG. 4, time management table Q is comprised of four time information storage areas R11 to R14. In first time information storage area R11 is stored the elapsed time (CURLIVE) following the transmission of a normal operation message. In second time information storage area R12 is stored the interval of time (ALIVETIME) during which the message of normal operation is transmitted. In third time information storage area R13 is stored the elapsed time (CURMONI) following the reception of a normal operation message. In fourth time information storage area R14 is stored a monitoring time (MONITIME) which is used as a threshold value to detect the occurrence of a failure in the father node.

Figure 5:
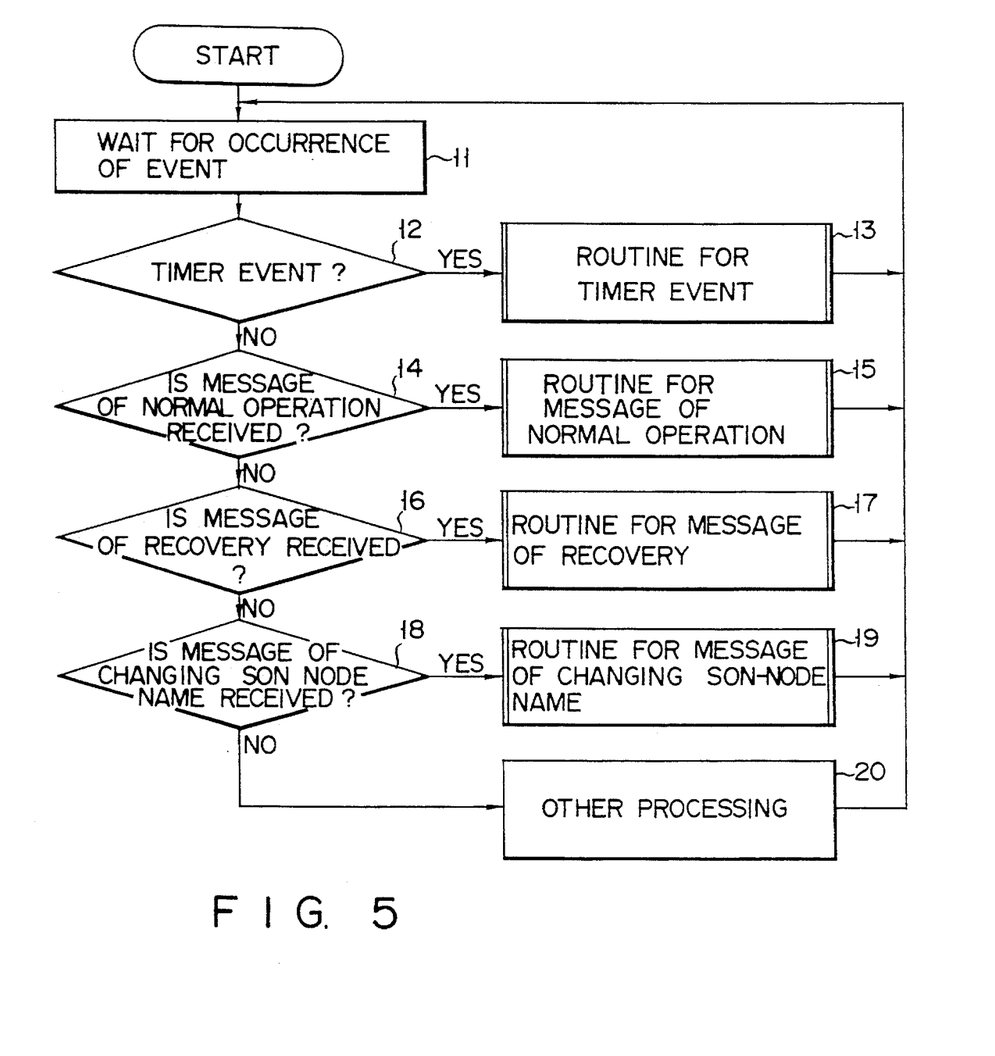
FIG. 5 is a flowchart of a supervising process executed by each processor in the loosely coupled multiprocessor system of FIG. 1.

Next, the procedure of the supervising process executed by each of processors P1 to P4 will be described with reference to the flowchart of FIG. 5. The processor waits for the occurrence of an event in step 11 and determines whether or not the event is a timer event in step 12 upon occurrence of the event. In the case of the timer event, a timer event routine is executed in step 13. In the timer event routine are executed processes of transmitting normal operation messages to the son node processors, supervising the normal operation messages transmitted from the father node processors and updating the time management tables. Those operations will be described later in detail in conjunction with FIG. 6.

If the event is not a timer event, a decision is made in step 14 as to whether or not a normal operation message has been received. If a normal operation message has been received, a routine for the normal operation message is executed in step 15. In the normal operation message routine, addresses are entered in the address management table on the basis of information I1 and I2 contained in the normal operation message. This process will be described later in detail in conjunction with FIG. 7.

If the received message is not a normal operation message, a decision is made in step 16 as to whether or not a recovery message has been received. If a recovery message has been received, a routine for the recovery message is executed in step 17. The recovery message routine is executed to re-admit the processor which transmitted the recovery message into the supervisory ring. This process will be described later in detail, in conjunction with FIG. 8.

If the received message is not a recovery message, a decision is made in step 18 as to whether or not a node change message has been received. If a node change message has been received, a routine for the node change message is executed in step 19. The node change message routine is adapted to make that node which is specified by the node change message a new son node. This process will be described later in detail, in conjunction with FIG. 9.

If the event is not a timer event, and the received message does not correspond to any of the normal operation message, the recovery message and the node change message, then another process will be carried out in step 20.

Figure 6:
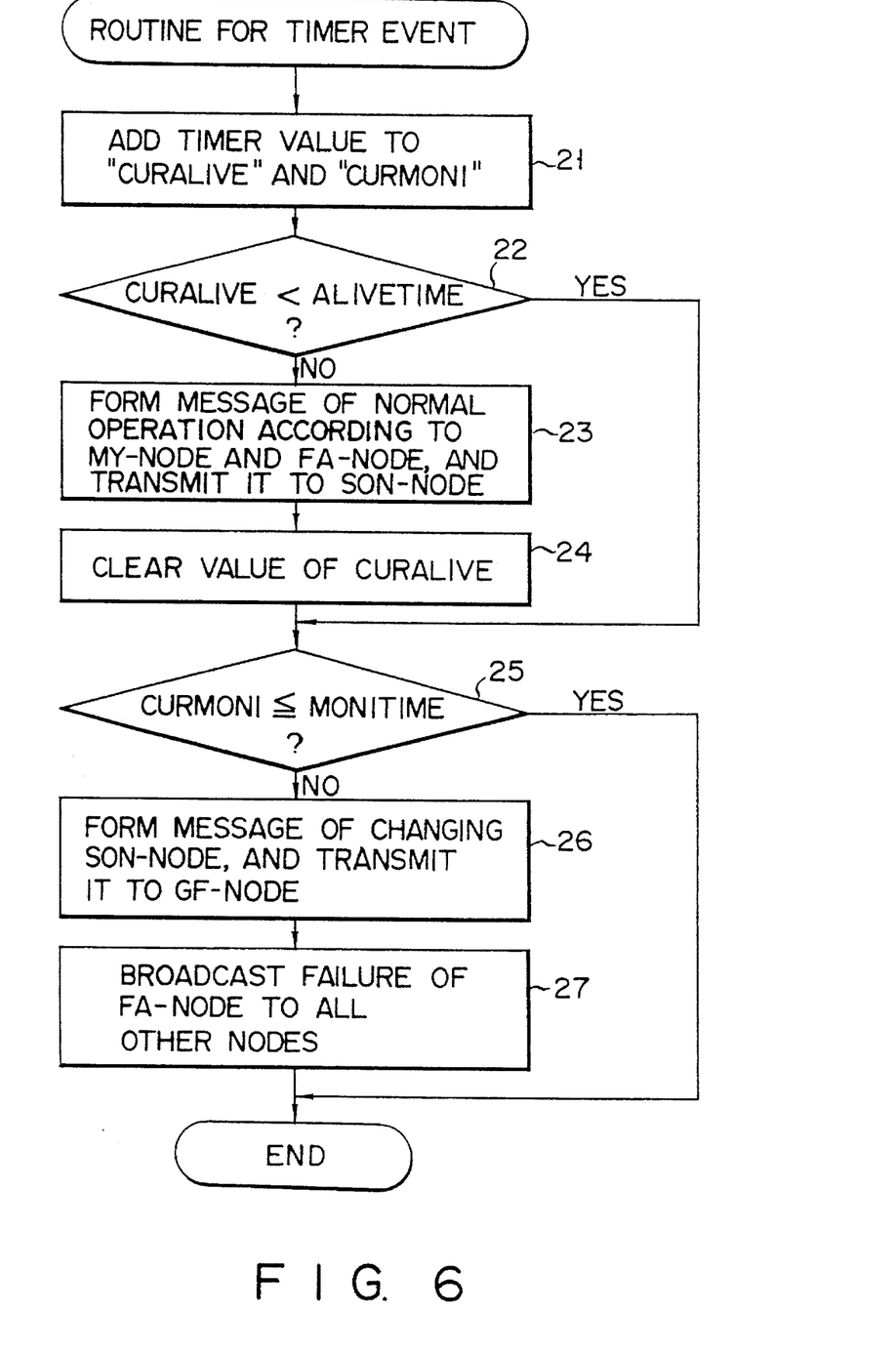
FIG. 6 is a flowchart of the time event routine executed by the supervising process shown in FIG. 5.

Next, the operation of the timer event routine of each processor will be described with reference to FIG. 6.

First, in step 21, each processor adds its own timer value to the time information CURALIVE, stored in storage area R11 of time management table Q shown in FIG. 4, to update the elapsed time from when a normal operation message was last transmitted. Also, the timer value is added to the time information CURMONI stored in storage area R13 of time management table Q, to update the elapsed time from when the normal operation message was last received. In subsequent step 22, a comparison is made between the time information ALIVETIME stored in storage area R12 of time management table Q, which represents an interval of time during which the normal operation message is transmitted, and the time information CURALIVE updated in step 21 to decide whether or not the time information CURALIVE is less than the time information ALIVETIME. When CURALIVE≧ALIVETIME, a time corresponding to the transmission time interval specified by the time information ALIVETIME has elapsed from when the normal operation message was last transmitted. Thus, the operation proceeds to step 23 in order to transmit the normal operation message.

In step 23, each processor creates a normal operation message in such a format as shown in FIG. 2 using its own address (MY-NODE address) stored in address storage area R4 of address management table T and the address of its father node (FA-NODE address) stored in address storage area R2. The normal operation message thus created is transmitted to the son node specified by the address stored in address storage area R1 of address management table T. After the normal operation message is transmitted, the operation proceeds to step 24 in which the elapsed time information CURALIVE stored in storage area R12 of time management table Q is cleared to zero. Then, the operation proceeds to step 25.

When CURALIVE<ALIVETIME in step 22, on the other hand, steps 23 and 24 are not executed, so that the operation directly proceeds from step 22 to step 25.

In step 25, each processor compares the time information MONITIME, which represents a time for monitoring the normal operation message, and is stored in storage area R14 of time management table Q, with the time information CURMONI updated in step 21, thereby deciding whether or not the time information CURMONI is equal to or less than the time information MONITIME. When CURMONI>MONITIME, a time corresponding to the monitoring time specified by the time information MONITIME has already elapsed from when the normal operation message was received last, thereby indicating that the father node processor has failed. In this case, the operation proceeds to step 26 in order to form a new supervisory ring excluding the failing father node processor.

In step 26, the processor which detected the occurrence of a failure in its father node processor generates a node change message to command the change of the son node, so that its grandfather node processor specified by the address stored in address storage area R3 of address management table T may be allocated as its new father node, and sends the node change message to the grandfather node processor. For example, if, in the configuration of FIG. 1, processor P2 detects the occurrence of a failure in processor P1 which is the father node of P2, then processor P2 creates a node change message for changing the son node of processor P4 from P1 to P2 in order that processor P4, which is the grandfather node of processor P2, may be allocated as the new father node of P2, and sends the node change message to processor P4. In the node change message, the message type "2" is set as information I0 to indicate that the message is a message which commands the change of a node, the address "B" of processor P2 is set as information I1 indicating the transmission source of the message, and the address "B" of processor P2 is set as information I2 indicating the name of a son node to be changed.

In subsequent step 27, that processor which detected the failure in its father node processor broadcasts to all the other processors that the father node processor has failed.

When CURMONI≤MONITIME, on the other hand, the timer event routine terminates without the execution of steps 26 and 27.

Figure 7:
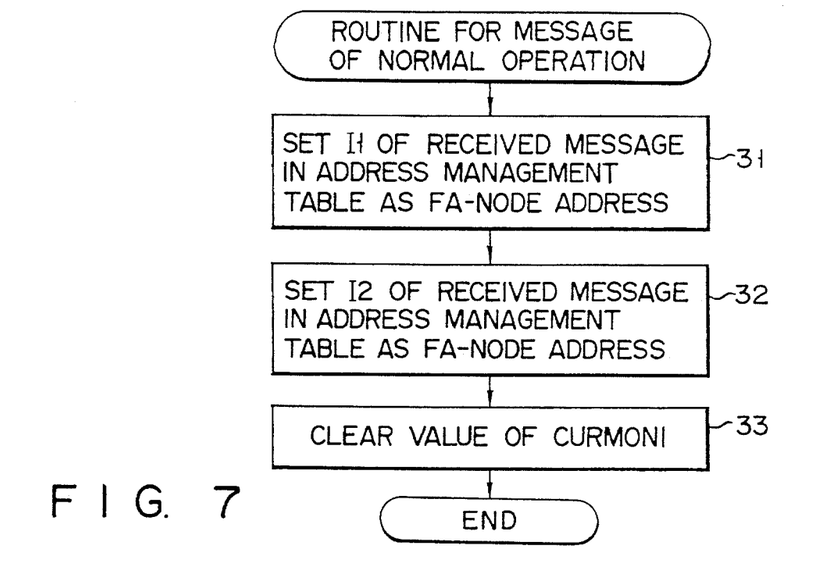
FIG. 7 is a flowchart of the message processing routine executed when a message of normal operation is received in the supervising process shown in FIG. 5.

Next, the operation of the routine for the normal operation message executed by each processor will be described with reference to FIG. 7.

In step 31, a processor which has received a message of normal operation first enters information I1 contained in the normal operation message, i.e., the address of the processor which transmitted the message, in address storage area R2 of address management table T, as the address of its father node. In subsequent step 32, the processor which received the normal operation message enters information I2 contained in the received message, i.e., the address of the father node of the processor which transmitted the message, in address storage area R3 of address management table T as the address of its grandfather node. In subsequent step 33, the processor which received the normal operation message clears the value stored in area R13 of time management table Q, i.e., the time information CURMONI indicating the elapsed time from when the normal operation message was last received, to zero, thereby terminating the routine.

Figure 8:
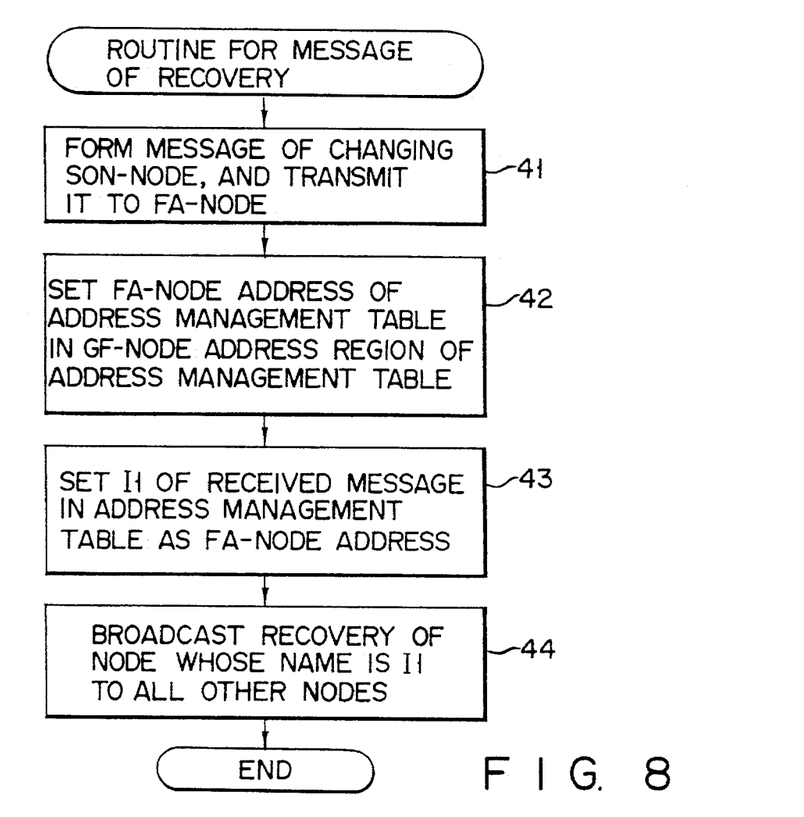
FIG. 8 is a flowchart of the message processing routine executed when a message of recovery is received in the supervising process shown in FIG. 5.

Next, the operation of a routine for a message of recovery executed by each processor will be described with reference to FIG. 8.

First, in step 41, a processor which has received a recovery message generates a node change message, so that the son node allocated to its father node processor is changed from the processor which received the recovery message to the processor which transmitted the recovery message, and sends the node change message to the father node processor.

In subsequent step 42, the processor which received the recovery message sets the address of its father node, stored in address storage area R2 of address management table T in address storage area R3, as the address of its grandfather node in order that the father node processor may become its new grandfather node processor. In step 43, the processor which has received the recovery message sets information I1 contained in the recovery message, i.e., the address of the processor which transmitted the recovery message, in address storage area R2 of address management table T, as the address of its father node in order that the processor which transmitted the recovery message may become its new father node processor. In subsequent step 44, the processor which received the recovery message broadcasts the recovery of the processor which transmitted the recovery message to all the other processors.

Figure 9:
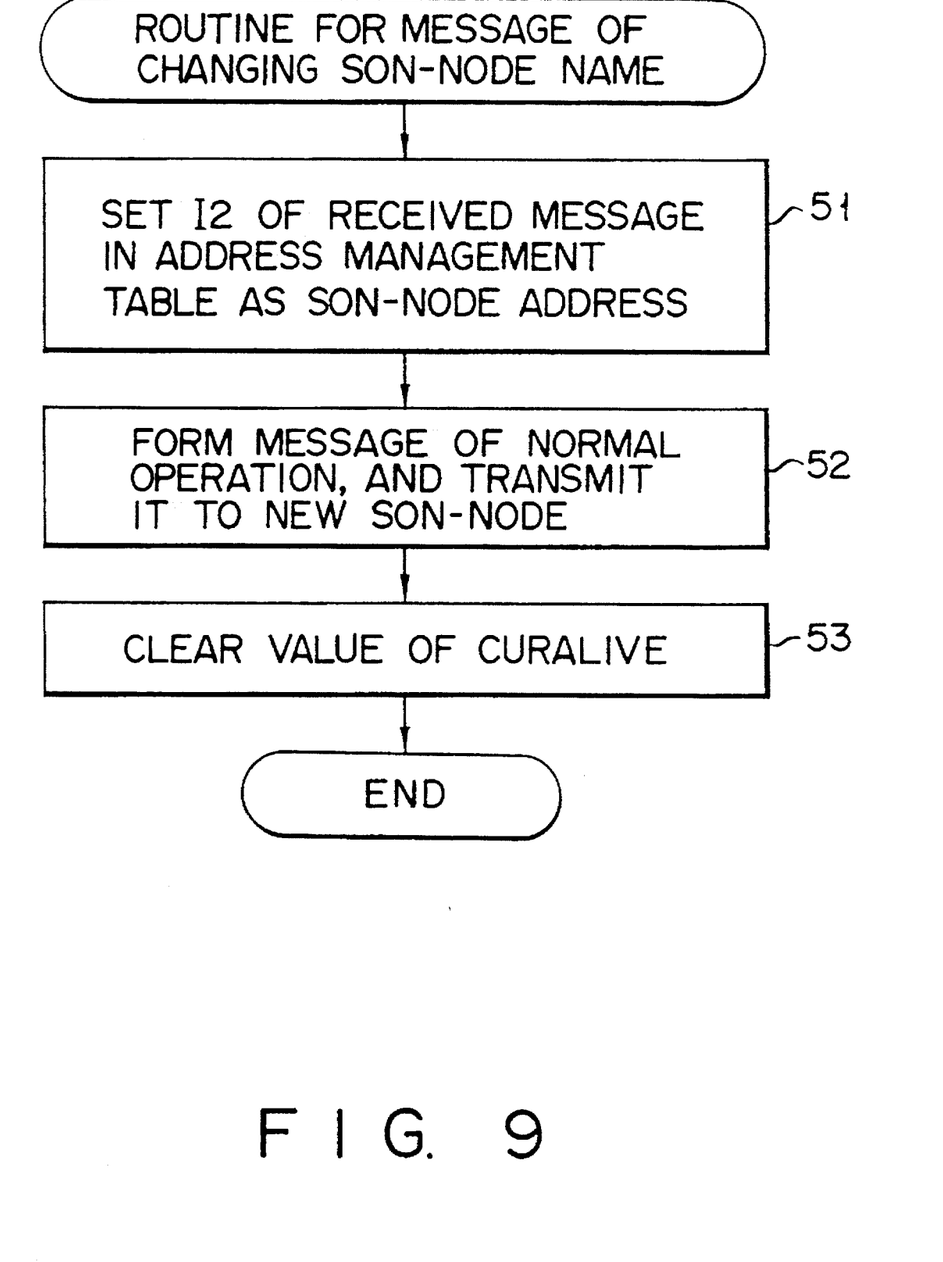
FIG. 9 is a flowchart of the message processing routine executed when a message for changing the prior node is received in the supervising process shown in FIG. 5.
Figure 10:
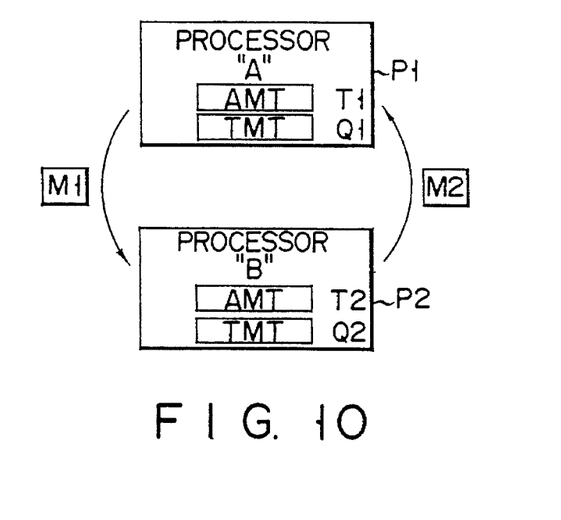
FIG. 10 is a conceptual diagram of a first example of a processor ring configured by the supervising process of the loosely coupled multiprocessor system of FIG. 1.

Next, the operation of the routine for node change message executed by each of processors P1 to P4 will be described with reference to FIG. 9.

In step 51, a processor which has received a node change message sets the son node address specified by information I2 contained in the node change message, in address storage area R1 of address management table T, as its new son node address in order to change its son node in accordance with the node change message. In subsequent step 52, the processor which received the node change message generates a normal operation message and transmits it to the processor which has been allocated as its new son node. The processor which received the node change message clears the elapsed time information CURALIVE, stored in storage area R12 of time management table, to zero in step 53.

Next, the specific operation for restructuring the supervisory ring, which is executed by each processor composing the loosely coupled multiprocessor system, will be described.

First, by referring to FIGS. 10, 11A, 11B and 11C, a description will be given of the reconfiguration operation of the supervisory ring, where processor P2 is restored to the normal operation enabling state when processor P1 is operating alone in the loosely coupled multiprocessor system of FIG. 1.

Figure 11A:
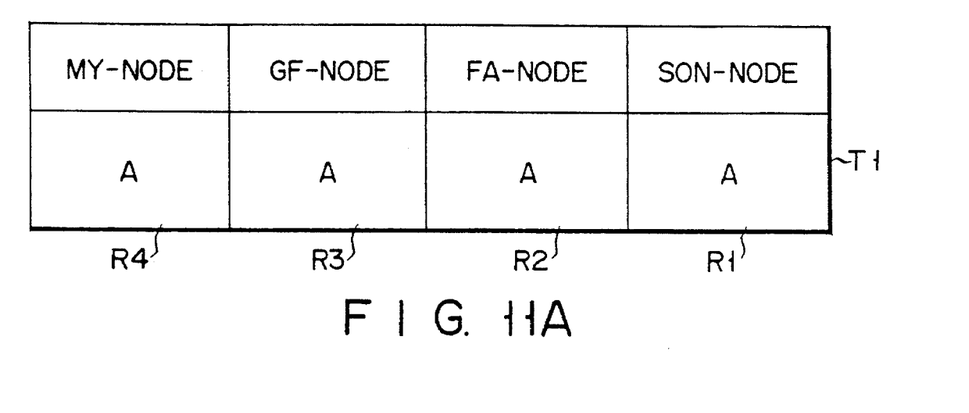
FIGS. 11A to 11C illustrate the contents of the address management tables of processors when the processor ring of FIG. 10 is configured.
Figure 11B:
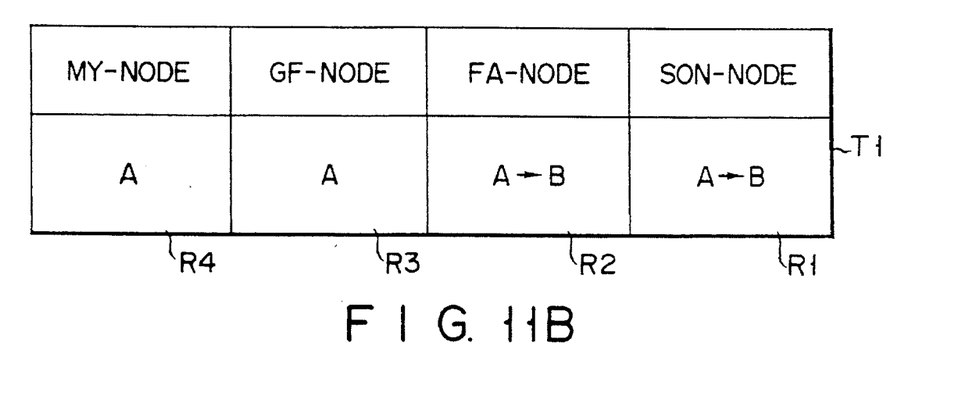
Figure 11C:
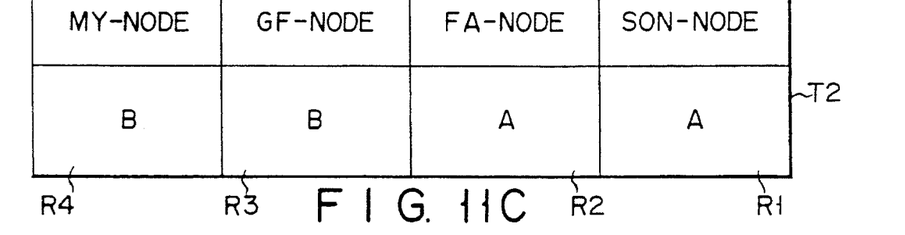

With processor P1 of address "A" operating alone, since both the son node and the father node of processor P1 are processor P1 itself, address "A" is stored in each of storage areas R1 to R4 of address management table (AMT) T1 of processor P1 as shown in FIG. 11A. On receipt of a recovery message from processor P2 in this state, processor P1 will recognize that processor P1 is operating alone because the addresses indicating its son node and father node in address management table T1 are both "A". For this reason, processor P1 returns a response message to processor P2, and changes both the son node address and the father node address in address storage areas R1 and R2 of address management table T1 from "A" to "B" in order that processor P2 may be allocated as its son node and father node. As a result, the contents of address management table T1 will be changed as shown in 11B. Then processor P1 creates a normal operation message M1 and transmits it to processor P2. The normal operation message M1 contains information I1 indicating that processor P1 is the transmission source of the message and information I2 indicating that the father node of processor P1 is processor P2 of address "B". Processor P2 enters address "A" as its son node address upon reception of the response to the recovery message from processor P1, and enters addresses "A" and "B" as its father node address and grandfather node address in address management table T2 on the basis of information I1 and I2 contained in the normal operation message from processor P1. As a result, the contents of address management table T2 will become as shown in FIG. 11C. Then, a normal operation message M2 is transmitted regularly from processor P2 to processor P1 and the normal operation message M1 is transmitted regularly from processor P1 to processor P2, thereby forming the supervisory ring of FIG. 10.

Next, by referring to FIG. 12 and FIGS. 13A to 13E a description will be given of the operation of reconfiguration of the supervisory ring where processor P3, which has recovered from a failure, is newly admitted to the supervisory ring, which was formerly comprised of processors P1 and P2.

Figure 13A:
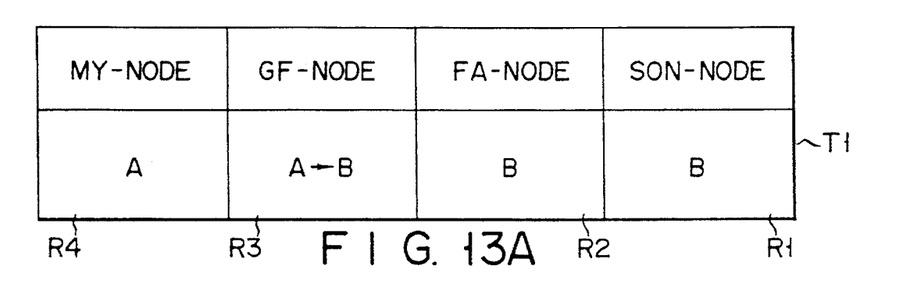
FIGS. 13A to 13E illustrate the contents of the address management tables of processors when the processor ring of FIG. 12 is configured.
Figure 13B:
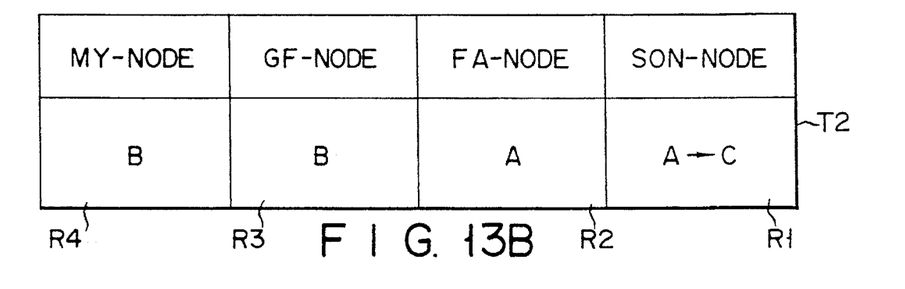

When processor P3 of address "C" transmits to processor P1 a recovery message indicating that it has been restored to an operation enabling state, processor P1 returns a response message to processor P3, and changes the grandfather node address stored in storage area R3 of address management table T1 from "A" to "B" as shown in FIG. 3A, in order to make processor P3 its new father node and the old father node its new grandfather node. In addition, processor P1 transmits to processor P2 a node change message to prompt processor P2 to change its son node from processor P1 to processor P3 in order that the recovering processor P3 may become the new son node of processor P2. Thus, processor P2 changes the son node address in storage area R1 of address management table T2 from "A" to "C" as shown in FIG. 13B. Then, processor P2 transmits a normal operation message M2 to processor P3, its new son node. The normal operation message M2 contains information I1 indicating that processor P2 is the transmission source of the message, and information I2 indicating that the father node of processor P2 is processor P1 of address "A".

Figure 13C:
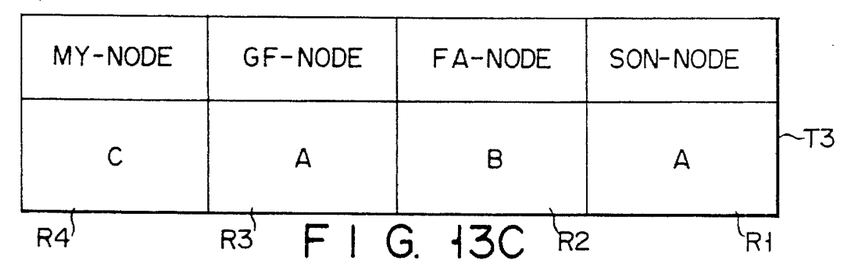

Processor P3 enters address "A" in address management table T3 as its son node address in response to a response message from processor P1, and enters addresses "B" and "A" as its father node address and grandfather node address, respectively, on the basis of information I1 and I2 contained in the normal operation message M2 from processor P2. As a result, the contents of address management table T3 will be as shown in FIG. 13C. Then, processor P3 transmits a normal operation message M3 to processor P1.

Figure 12:
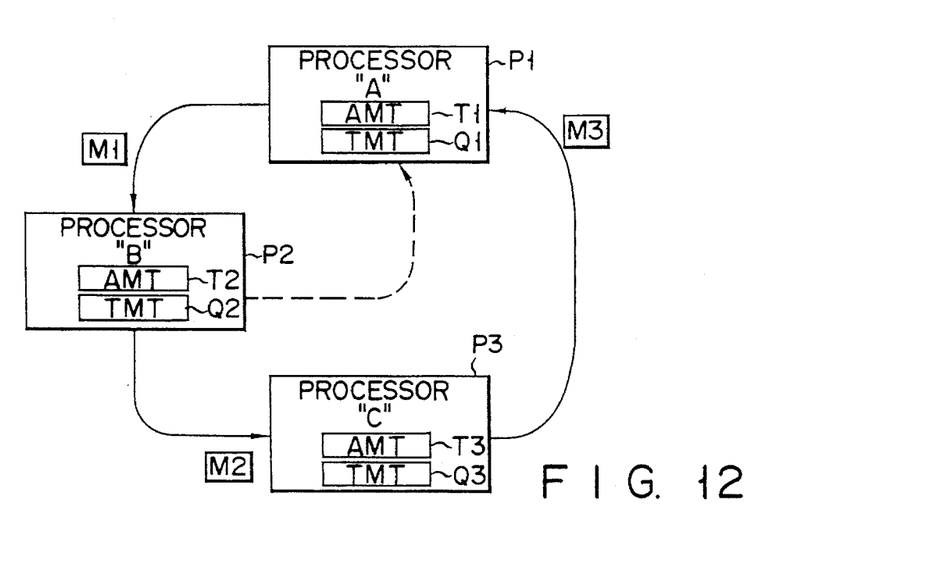
FIG. 12 is a conceptual diagram of a second example of the processor ring configured by the supervising process of the loosely coupled multiprocessor system of FIG. 1.
Figure 13D:
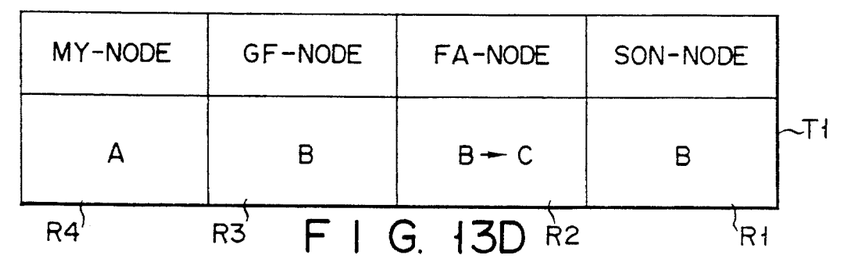
Figure 13E:
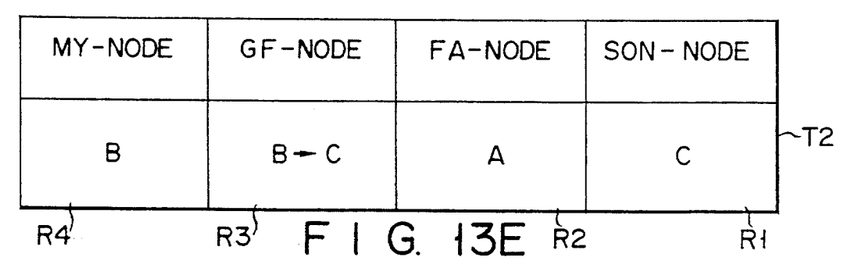

On the basis of normal operation message M3 from processor P3, processor P1 recognizes that its father node is processor P3 of address "C" and then changes its father node address stored in address storage area R2 of address management table T1 from ΘB" to "C" as shown in FIG. 13D. Then, processor P1 transmits normal operation message M1 to processor P2. On the basis of normal operation message M1 from processor P1, processor P2 recognizes that its grand father node is processor P3 of address "C" and then changes its grandfather node address, stored in address storage area R3 of address management table T2, from "B" to "C" as shown in FIG. 13E. The supervisory ring of FIG. 12 is thus configured.

Next, by referring to FIGS. 14, 15A, 15B and 15C a description will be given of the operation of reconfiguration of the supervisory ring in the event of a failure in processor P4 during normal operation of processors P1 to P4.

Figure 14:
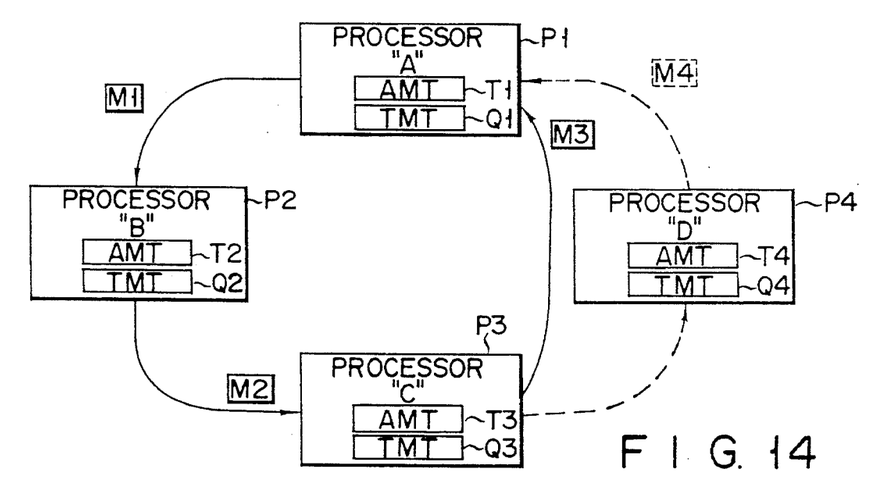
FIG. 14 is a conceptual diagram of a third example of the processor ring configured by the supervising process of the loosely coupled multiprocessor system of FIG. 1.

In the event of a failure in processor P4, the transmission of normal operation message M4 from processor P4 to processor P1 is interrupted. Processor P1 determines that processor P4 has failed at that point in time when the elapsed time CURMONI, from when processor P1 east received the normal operation message M4, exceeds the preset monitoring time MONITIME. Then, processor P1 transmits a node changing message to processor P3, which is the grandfather node of P1, to prompt processor P3 to change its son node from processor P4 to processor P1.

Figure 15A:
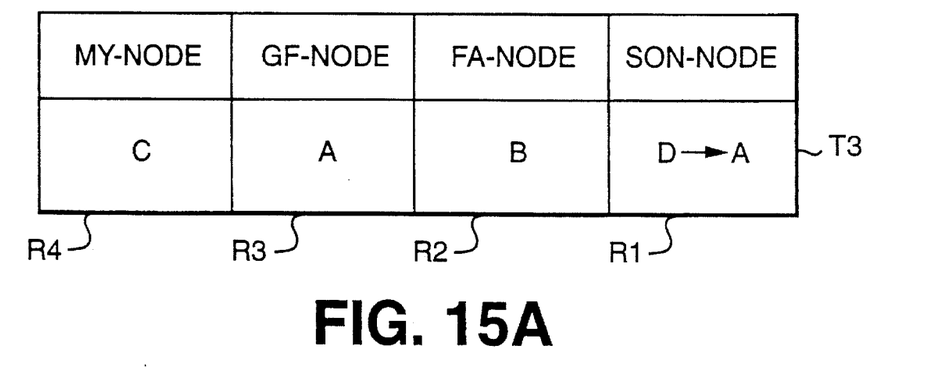
FIGS. 15A to 15C illustrate the contents of the address management tables of processors when the processor ring of FIG. 14 is configured.
Figure 15B:
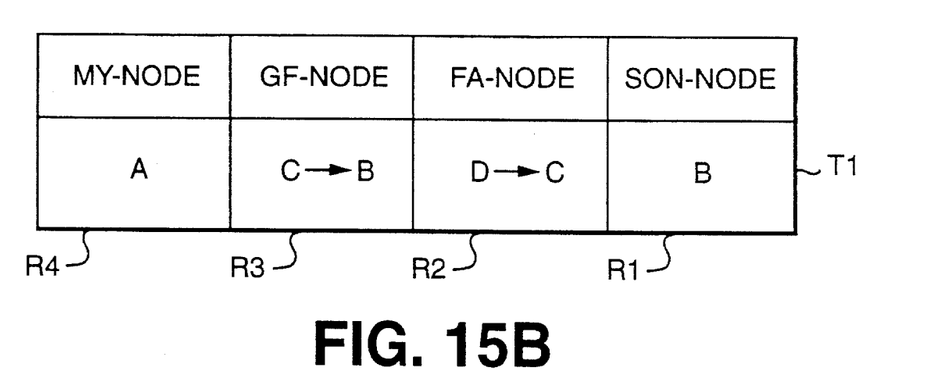
Figure 15C:
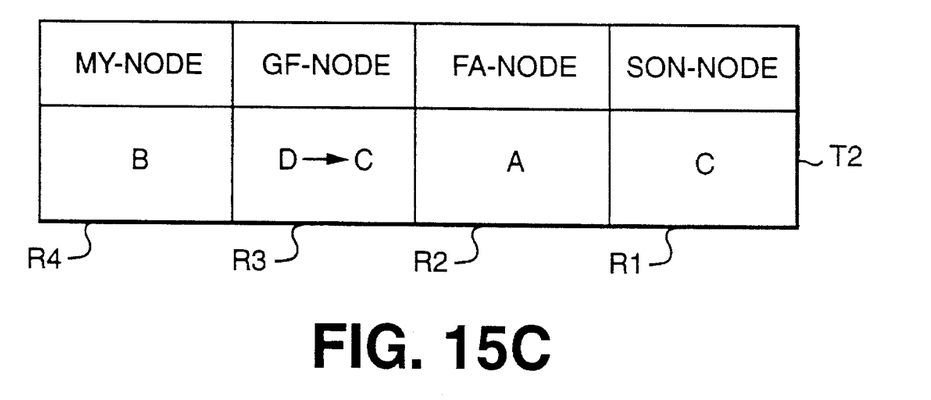

In response to the node change message from processor P1, processor P3 changes the address of its son node stored in address storage area R1 of address management table T3 from "D" to "A", as shown in FIG. 15A. Then processor P3 transmits normal operation message M3 to processor P1. This normal operation message M3 contains information I1 indicating that the transmission source of the message is processor P3 of address C and information I2 indicating that the father node of processor P3 is processor P2 of address "B". Processor P1 recognizes that its new father node and grandfather node are processor P3 of address "C" and processor P2 of address "B", respectively, from information I1 and I2 contained in normal operation message M3 transmitted from processor P3, and then changes the address of its father node stored in address storage area R2 of address management table T1 from "D" to "C" and the address of its grandfather node stored in address storage area R3 from "C" to "B", as shown in FIG. 15B. Then processor P1 transmits normal operation message M1 to processor P2. This normal operation message M1 contains information I1 indicating that the transmission source of the message is processor P1 of address "A" and information I2 indicating that the father node of processor P1 is processor P3 of address "C". Processor P2 recognizes its new grandfather node to be processor P3 of address "C" from information I2 contained in normal operation message M1 from processor P1 and then changes the address of its grandfather node stored in address storage area R3 of address management table T2 from "D" to "C", as shown in FIG. 15C.

Figure 16:
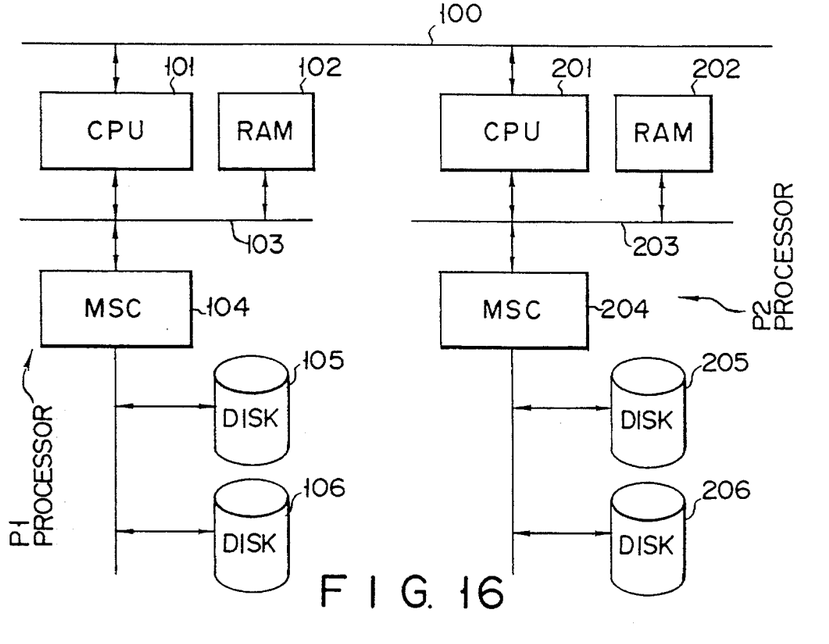
FIG. 16 is a block diagram illustrating a specific configuration of each processor in the loosely coupled multiprocessor system of FIG. 1.

Next, a specific configuration of each of processors P1 to P4 in the multiprocessor system illustrated in FIG. 1 will be described with reference to FIG. 16, in which only two processors P1 and P2 are illustrated.

Processor P1 is composed of a CPU 101, a RAM 102, an internal bus 103, a mass storage controller (MSC) 104 and hard disk units (DISK) 105 and 106. CPU 101 of processor P1 is connected to processor P2 via a bus 100, dedicated to inter-CPU communications.

In processor P1, CPU 101 controls the entire operation of processor P1 and executes various kinds of data processing as well as the supervisory operation described in conjunction with the flowcharts of FIGS. 5 through 9. In the supervisory operation, CPU 101 transmits a normal operation message regularly to its son node processor P2 via bus 100. Also, CPU 101 transmits a node change message or a recovery message to processor P2 via bus 100 as need arises. In RAM 102 are stored a program for the supervising process executed by CPU 101, address management table T1 illustrated in FIG. 3 and time management table Q1 illustrated in FIG. 4. Mass storage controller 104 executes read/write access to hard disk units 105 and 106 under the control of CPU 101.

Processor P2 is structured in the same manner as processor P1. That is, processor P2 is composed of a CPU 201, a RAM 202, an internal bus 203, a mass storage controller (MSC) 204 and hard disk units (DISK) 205 and 206.

In processor P2, CPU 201 controls the entire operation of processor P2 and executes various kinds of data processing and the supervisory operation described in conjunction with the flowcharts of FIGS. 5 through 9. In the supervisory operation, CPU 201 transmits a normal operation message regularly to its son node processor P3 (not shown in FIG. 16)

via bus 100. Also, CPU 201 transmits a node change message or a recovery message to processor P1 via bus 100 as need arises. In RAM 202 are stored a program for the supervising process executed by CPU 201, address management table T2 illustrated in FIG. 3 and time management table Q2 illustrated in FIG. 4. Mass storage controller 204 executes read/write access to hard disk units 205 and 206 under the control of CPU 201.

Figure 17:
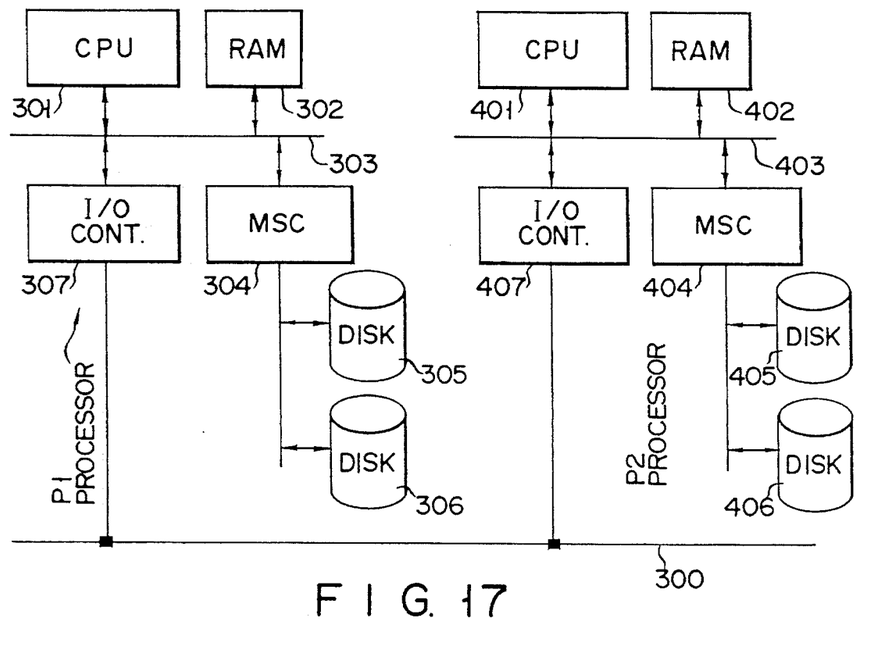
FIG. 17 is a block diagram illustrating the other specific configuration of each processor in the loosely coupled multiprocessor system of FIG. 1.

Next, another example of the specific configuration of each of processors P1 to P4 in the multiprocessor system of FIG. 1 will be described with reference to FIG. 17. In FIG. 17 as well, only two processors P1 and P2 are illustrated.

Processor P1 is composed of a CPU 301, a RAM 302, an internal bus 303, a mass storage controller (MSC) 304, hard disk units (DISK) 305 and 306 and an input/output controller (I/O CONT) 307. CPU 101 of processor P1 is connected to processor P2 via a communication line 300 of a LAN.

In processor P1, CPU 301 controls the entire operation of processor P1 and executes various kinds of data processing and the supervisory operation described in conjunction with the flowcharts of FIGS. 5 through 9. In the supervisory operation, CPU 301 transmits a normal operation message regularly to its son node processor P2 via communication line 300 in association with input/output controller 307. Also, in association with input/output controller 307, CPU 301 transmits a node change message or a recovery message to processor P2 via communication line 300 as need arises. In RAM 302 are stored a program for the supervising process executed by CPU 301, address management table T1 illustrated in FIG. 3 and time management table Q1 illustrated in FIG. 4. Mass storage controller 304 executes read/write access to hard disk units 305 and 306 under the control of CPU 301. Input/output controller 307 allows data or message transmission between processor P1 and communication line 300 under the control of CPU 301.

Processor P2 is structured in the same manner as processor P1. That is, processor P2 is composed of a CPU 401, a RAM 402, an internal bus 403, a mass storage controller (MSC) 404, hard disk units (DISK) 405 and 406 and an input/output controller (I/O CONT) 407.

In processor P2, CPU 401 controls the entire operation of processor P2 and executes various kinds of data processing and the supervisory operation described in conjunction with the flowcharts of FIGS. 5 through 9. In the supervisory operation, CPU 401 transmits a normal operation message regularly to its son node processor P3 (not shown in FIG. 17) via communication line 300. Also, CPU 401 transmits, in association with input/output controller 407, a node change message or a recovery message to processor P1 via communication line 300 as need arises. In RAM 402 are stored a program for the supervising process executed by CPU 401, address management table T2 illustrated in FIG. 3 and time management table Q2 illustrated in FIG. 4. Mass storage controller 404 executes read/write access to hard disk units 405 and 406 under the control of CPU 401. Input/output controller 407 allows data or message transmission between processor P2 and communication line 300 under the control of CPU 401.

According to the multiprocessor system of the present invention as described above, processors P1 to P4 are coupled in a ring in accordance with father node and son node addresses stored in each of them, each of processors P1 to P4 supervises the operating state of its respective individual father node processor by means of a normal operation message therefrom, and each of the processors has its operating state supervised by its respective individual son node processor by means of a normal operation message transmitted to its respective individual son node processor. For this reason, processors P1 to P4 can supervise each other for their operating states only by transmission of normal operation messages from father node processors to their respective son node processors. Therefore, a highly reliable supervising process can be achieved with few communication messages, improving the data processing capability of the multiprocessor system.

Furthermore, by updating address information stored in address management tables T1 to T4 of processors P1 to P4, it becomes easy to perform the reconfiguration of a supervisory ring, that is, the admission of a processor to the supervisory ring or the withdrawal of a processor from the supervisory ring.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. In a network comprised of a plurality of nodes, a current node comprising:

a node address table for holding addresses of the current node, a child node, a parent node, and a grandparent node, wherein normal operating messages in the network are transmitted among the plurality of nodes with the grandparent node transmitting normal operating messages to the parent node, the parent node transmitting normal operating messages to the current node, and the current node transmitting normal operating messages to the child node;

normal operating message receiving and supervising means for receiving normal operating messages from the parent node, including the address of the grandparent node, for updating the node address table with the address of the grandparent node, and for generating a signal when the current node fails to receive the normal operating message from the parent node; and node change message transmitting means, initiated by the signal generated by the normal operating message receiving and supervising means, for transmitting a node change message to the grandparent node, including the address of the current node, wherein the grandparent node is identified by the address in the node address table, and the grandparent node comprising:

a node address table for addresses of the parent node and the grandparent node; and node change message receiving and updating means for receiving the node change message from the current node and for updating its node address table, replacing the address of the parent node with the address of the current node, which was included in the node change message, and the parent node comprising:

recovery message transmitting means for transmitting a recovery message to the current node when it recovers from a failure, including the address of the parent node, and the current node further comprising:

recovery message receiving means for receiving the recovery message from the parent node;

recovery message processing means for updating the node address table of the current node, replacing the address of the grandparent node with the address of the parent node; and recovery node change message generating and transmitting means for generating a message to the grandparent node indicating the recovery of the parent node and including the address of the parent node, and the grandparent node further comprising:

recovery node change message receiving means for receiving the recovery node change message from the current node; and     recovery message updating means for updating the node address table of the grandparent node, replacing the address of the current node with the address of the parent node in the recovery node change message.

2. The network according to claim 1, wherein the nodes are processors with the network constituting a multiprocessor system.

3. The network according to claim 2, wherein the processors communicate with each other by means of a bus.

4. The network according to claim 2, wherein the processors communicate with each other by means of a local area network.

5. In a multiprocessor system comprised of a plurality of processors, each processor comprising:

an address table for holding addresses of a current processor, a child processor, a parent processor, and a grandparent processor, wherein normal operating messages in a network area transmitted among the plurality of processors with the grandparent processor transmitting normal operating messages to the parent processor, the parent processor transmitting normal operating messages to the current processor, and the current processor transmitting normal operating messages to the child processor;

normal operating message transmitting means for transmitting a normal operating message which indicates that the current processor is operating normally only to the child processor designated by the child processor address at regular intervals, the normal operating message including the parent processor address;

normal operating message receiving and supervising means for receiving from the parent processor normal operating messages including the address of the grandparent processor, for updating the address table with the address of the grandparent processor, and for generating a signal when the current processor fails to receive the normal operating message from the parent processor;

child node change message transmitting means, initiated by the signal generated by the normal operating message receiving and supervising means, for transmitting to the grandparent processor a child node change message including the address of the current processor, wherein the grandparent processor is identified by the grandparent processor address in the address table;

child node change message receiving and updating means for receiving the child node change message from one of the other processors and for updating its address table, replacing the address of the child processor with the address which was included in the child node change message;

recovery message receiving means for receiving the recovery message from one of other processors which is newly added to the multiprocessor system;

recovery message processing means for transmitting to the parent processor a recovery node change message including the address of the newly added processor which was included in the recovery message, and for updating the address table of the current processor, replacing the address of the parent processor with the address of the newly added processor;

recovery node change message receiving means for receiving the recovery node change message from one of the other processors; and recovery message updating means for updating the address table of the current processor, replacing the address of the child node with the address of the newly added processor which was included in the recovery node change message.

6. The system according to claim 5, wherein the processors communicate with each other by means of a bus.

7. The system according to claim 5, wherein the processors communicate with each other by means of a local area network.

* * * * *